United States Patent
Unno et al.

(10) Patent No.: US 7,971,029 B2
(45) Date of Patent: Jun. 28, 2011

(54) BARRIER SYNCHRONIZATION METHOD, DEVICE, AND MULTI-CORE PROCESSOR

(75) Inventors: Hideyuki Unno, Kawasaki (JP); Masaki Ukai, Kawasaki (JP); Matthew Depetro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/638,746

(22) Filed: Dec. 15, 2009

(65) Prior Publication Data

US 2010/0095090 A1 Apr. 15, 2010

(51) Int. Cl.
*G06F 15/177* (2006.01)
*G06F 15/76* (2006.01)

(52) U.S. Cl. .......................................... 712/28; 712/30

(58) Field of Classification Search ............. 712/28, 712/30
See application file for complete search history.

(56) References Cited

U.S. PATENT DOCUMENTS

| | | | |
|---|---|---|---|
| 5,634,071 A | 5/1997 | Dewa et al. | |
| 5,940,856 A * | 8/1999 | Arimilli et al. | 711/119 |
| 5,978,830 A * | 11/1999 | Nakaya et al. | 718/102 |
| 7,191,294 B2 | 3/2007 | Nakamura et al. | |
| 7,277,989 B2 * | 10/2007 | Chaudhry et al. | 711/122 |
| 7,356,653 B2 * | 4/2008 | von Praun et al. | 711/147 |
| 2003/0214845 A1 * | 11/2003 | Yamazaki | 365/189.04 |
| 2005/0050374 A1 | 3/2005 | Nakamura et al. | |
| 2005/0154831 A1 * | 7/2005 | Steely et al. | 711/130 |
| 2006/0212868 A1 * | 9/2006 | Takayama et al. | 718/100 |
| 2006/0248263 A1 * | 11/2006 | Tanigawa | 711/3 |

FOREIGN PATENT DOCUMENTS

| | | |
|---|---|---|
| JP | 2-144657 | 6/1990 |
| JP | 6-187303 | 7/1994 |
| JP | 9-6734 | 1/1997 |
| JP | 10-240549 | 9/1998 |
| JP | 2005-71109 | 3/2005 |
| JP | 2005-316679 | 11/2005 |
| JP | 2006-259821 | 9/2006 |

* cited by examiner

*Primary Examiner* — Daniel Pan
(74) *Attorney, Agent, or Firm* — Fujitsu Patent Center

(57) ABSTRACT

A barrier synchronization device for realizing barrier synchronization of at least 2 processor cores belonging to a same synchronization group among a plurality of processor cores is included in a multi-core processor having a plurality of processor cores, and when two or more processor cores in that multi-core processor belong to the same synchronization group, the included barrier synchronization device is used for realizing barrier synchronization.

13 Claims, 11 Drawing Sheets

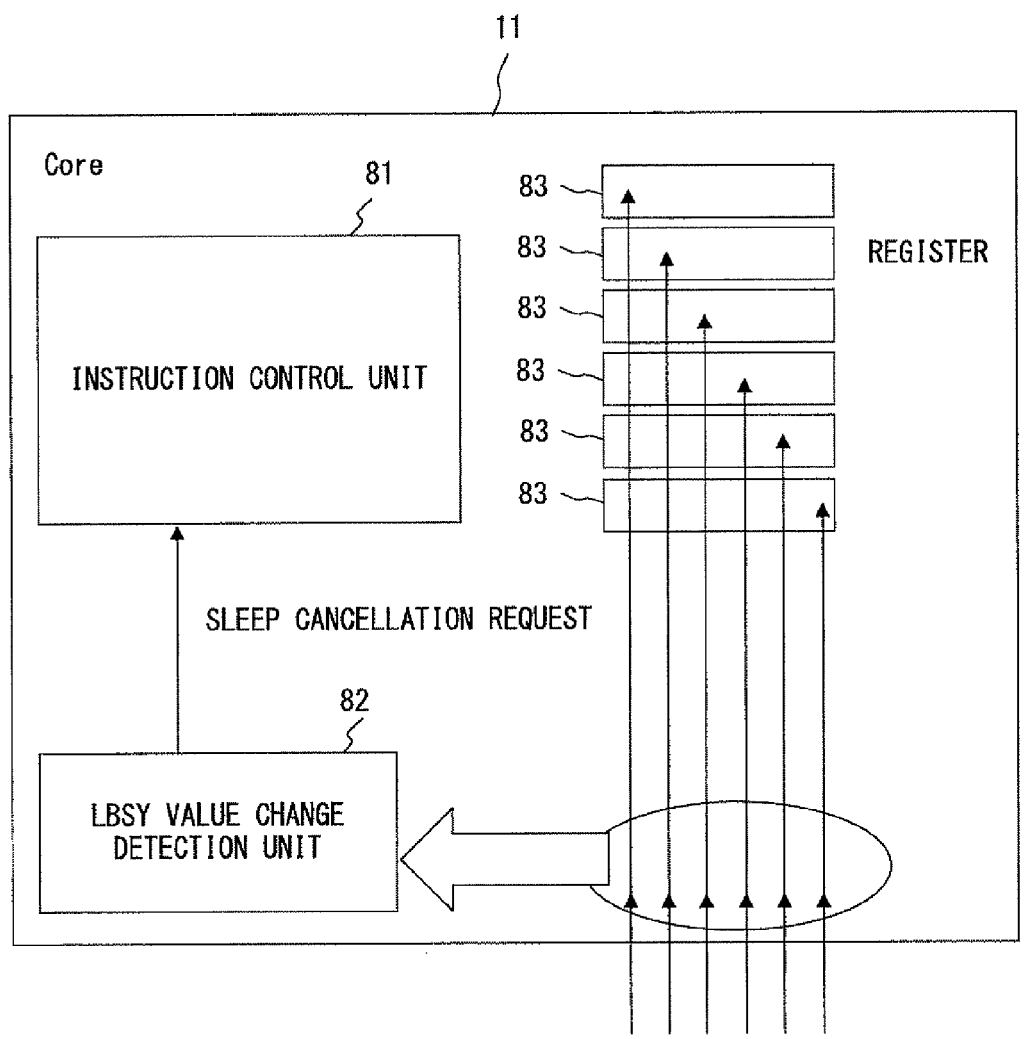
F I G. 8

BARRIER SYNCHRONIZATION METHOD, DEVICE, AND MULTI-CORE PROCESSOR

CROSS-REFERENCE TO RELATED APPLICATION

This application is based upon and claims the benefit of priority from the prior International Application No. PCT/JP2007/000664 filed on Jun. 20, 2007, the entire contents of which are incorporated herein by reference.

FIELD

The embodiments discussed herein are related to a technique for realizing barrier synchronization of two or more processor cores or processors belonging to the same synchronization group.

BACKGROUND

Computer systems are being required to achieve higher processing speeds and larger processing volume (throughput). This increases the importance of distributed processing, which can be realized by using plural processors. In order to meet the requirements of both higher processing speed and larger processing volume at adequate cost, distributed processing has to be realized at a high efficiency. Barrier synchronization is one technique that can realize distributed processing at a high efficiency, and is widely used for high-performance computer systems nowadays.

To perform barrier synchronization, plural processors are divided into synchronization groups so that the progress of processes is managed in units of synchronization groups. Under management using this method, the execution target is shifted from a currently executed process to the next process when all processors belonging to a synchronization group have finished the process that they are currently executing. Barrier synchronization devices for realizing barrier synchronization are disclosed, for example, by Patent Documents 1 through 3.

In order to manage the progress of processes in units of synchronization groups, each processor has to report the execution status of a process to other processors, and when each processor has entered a situation in which it has to shift to the next process, the processor also has to report this fact to other processors. Accordingly, distributed processing is roughly classified into two portions; a parallel processing portion and a coordinated operation portion. A parallel processing portion executes process that respective processors have to execute parallelly. A coordinated operation portion is executed in order to make processors operate in a coordinated manner. In order to increase efficiency in distributed processing, it is important to minimize the ratio (time period) needed to execute a coordinated operation portion (synchronization process).

In recent years, improvement in semiconductor technology has promoted commercialization of multi-core processor having plural processor cores (each processor core having various units for decoding and executing instructions, a registers, cache memory, and the like) each having a computing function. In this type of multi-core processor, synchronization groups are assigned to individual processor cores. This assignment can bring about a situation in which all processor cores belonging to the same synchronization group are in one multi-core processor. It is thought to be important to take this situation into consideration when a time period taken to execute a coordinated operation portion is to be reduced.

Improvement in semiconductor technique has contributed to an increase in processing speed and circuit density of processors and to an increase in capacity of memory. As a result, higher computation performance is realized using an area smaller than realized by conventional techniques, and such areas have become larger. However, the speed of accessing main memory is still lower than the processing speed of a processor. Rather, the gap between processing the speed of processors and operation speed of main memory has become more serious. Accordingly, when some information is transferred via main memory, a period of time taken to execute a coordinated operation portion is influenced by the operation speed of the main memory, which is lower. This point as well has to be taken into consideration in reducing a period of time taken to execute a coordinated operation portion.

Patent Document 1: Japanese Laid-open Patent Publication No. 6-187303
Patent Document 2: Japanese Laid-open Patent Publication No. 9-6734
Patent Document 3: Japanese Laid-open Patent Publication No. 2005-71109

DISCLOSURE OF THE INVENTION

A barrier synchronization method according to a first aspect of the present invention is a barrier synchronization method for synchronizing processes executed by processor cores in a processor having a plurality of processor cores, including a step of assigning, to a same synchronization group, processor cores to be synchronized among the plurality of processor cores, and a step of synchronizing processes executed by the processor cores belonging to the same synchronization group.

In the first aspect of the present invention, it is desirable that the barrier synchronization method further include, each of the processor cores included in the processor having a memory, and that the step of synchronizing processes executed by the processor cores include a step of storing, in the memory, synchronization information specifying whether or not the processor cores belonging to the same synchronization group have to shift to a next process. It is desirable that it further include, in addition to the above or instead of the above, a step of making a processor core shift to a quiescent state while a processor core that has completed a process is shifting to a next process when one of the plurality of processor cores has completed a process to be executed.

The barrier synchronization method according to the second aspect is a barrier synchronization method for synchronizing processes executed by processors in an information processing apparatus having a plurality of processors, including a step of making a processor core shift to a quiescent state while a processor core that has completed a process is shifting to a next process when one of the plurality of processors has completed a process to be executed, and a step of returning the processor that was made to shift to the quiescent state to a state before the quiescent state when a timing to shift to a next process has come.

The barrier synchronization device according to the first aspect of the present invention is a barrier synchronization device included in a multi-core processor in order to synchronize at least 2 processor cores belonging to a same synchronization group among a plurality of processor cores included in the multi-core processor, including first information storage unit capable of for storing state information representing execution states of processes respectively of the plurality of processor cores, second information storage unit capable of for storing combination information representing combinations of processor cores belonging to each of synchronization groups, third information storage unit capable of for storing synchronization information representing whether or not the processor cores belonging to the same synchronization group have to shift to a next process, and information updating unit capable of for updating, on the basis of the state information and the combination information respectively stored in the first and second information storage unit, the synchronization information stored in the third information storage unit.

The barrier synchronization device according to the second aspect of the present invention further includes, in addition to the configuration of the above first aspect, information writing unit capable of for writing, through a dedicated wire, the synchronization information stored in the third information storage unit to memory included in the processor cores.

In the above first and second aspects, it is desirable that N, which is the total number of combinations of the second and third information storage unit and the information updating unit, satisfy:

$$N \geq 2M \cdot X$$

where M represents the total number of the processor cores, and X represents the total number of logic processors of a processor core.

A multi-core processor according to the present invention includes a barrier synchronization device for synchronizing at least 2 processor cores belonging to a same synchronization group among the plurality of processor cores, and reporting unit capable of for reporting, to the barrier synchronization device, state information indicating execution status of respective processes of the plurality of processor cores.

According to the present invention, a multi-core processor is implemented with a barrier synchronization device for realizing barrier synchronization, and when two or more processor cores in that multi-core processor belong to the same synchronization group, the barrier synchronization device is used for realizing barrier synchronization of these processor cores. Thereby, a situation is avoided in which barrier synchronization requires data to be transmitted or received to and from units other than the multi-core processor, and thus processes for barrier synchronization can be performed at very high speed.

When synchronization information representing whether or not processor cores belonging to the same synchronization group have to shift to the next process is directly written to memory in the processor cores, those processor cores can confirm the synchronization information at a higher speed. Thereby, a period of time taken for synchronization processes executed for barrier synchronization is reduced so as to reduce the ratio of those processes to the entire process.

When a processor core that has finished a process to execute is made to shift to a quiescent state (which consumes fewer calculation resources and less power) while it is shifting to the next process, it is possible to reduce power consumption while avoiding degradation in processing performance.

When N, which is the total number of combinations of the second and third information storage unit and the information updating unit, satisfies:

$$N \geq 2M \cdot X$$

where M represents the total number of the processor cores, and X represents the total number of logic processors of a processor core, it is highly likely that more synchronization groups can be responded to without the need to update combination information stored in the second storage unit. Thus, the number of synchronization processes to be executed by processor cores for realizing barrier synchronization can be reduced so that barrier synchronization can be accelerated.

The object and advantages of the invention will be realized and attained by unit of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 8 illustrates a configuration of a processor core for the writing mechanism illustrated in FIG. 6;

BEST MODES FOR CARRYING OUT THE INVENTION

Figure 1:
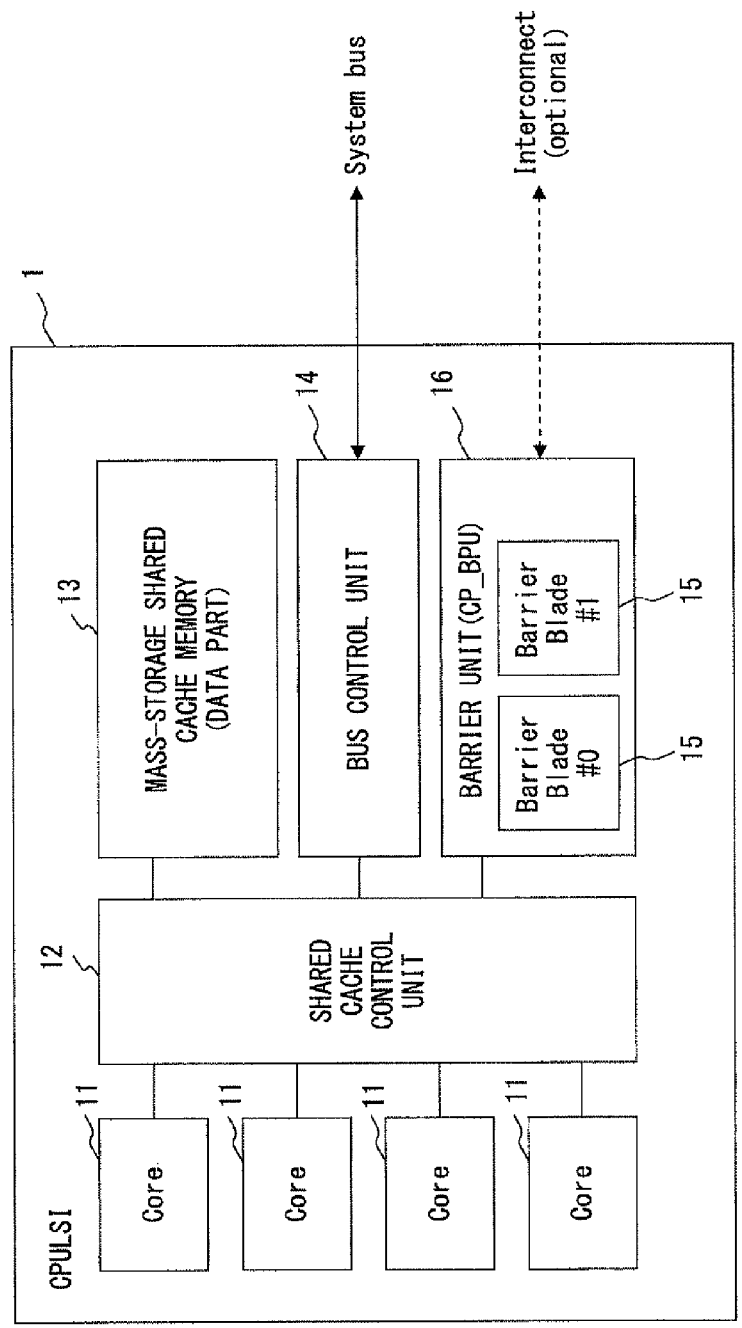
FIG. 1 illustrates a configuration of a multi-core processor according to the present embodiment.

Hereinafter, examples of embodiments of a barrier synchronization method, device, and a multi-core processor according to the present invention will be explained in detail by referring to the drawings.

FIG. 1 illustrates a configuration of a multi-core processor (CPU LSI) according to the present embodiment. As illustrated in FIG. 1, a processor 1 includes four processor cores 11 (being referred to as "core" in FIG. 1, and including various units for executing or decoding instructions, registers, cache memory, and the like). Each of the processor cores 11 (hereinafter, referred to as core) is connected to a shared cache control unit 12, and is configured to access or transmit and receive data to and from mass-storage shared cache memory (data port) 13, a bus control unit 14, and a barrier unit 16. A barrier synchronization device according to the present embodiment is realized in the form of the barrier unit 16.

When all the cores 11 belonging to the same synchronization group are in the corresponding processor 1, the barrier unit 16 performs a process for realizing barrier synchronization of that synchronization group. Thereby, the necessity of transmitting and receiving data to and from devices out of the processor 1 to realize the barrier synchronization is eliminated. Barrier synchronization is realized in the processor 1 and data transmission/reception, which is slower than the processing speed in the processor, is not performed so that the process for that barrier synchronization can be performed at very high speed.

The above multi-core processor (referred to as processor, hereinafter) 1 is designed to be used for building a high-performance computer system. As illustrated, for example, in FIG. 2, such a computer system adopts a configuration in which a plurality of computer nodes 21, each of which serves as a computer system, are connected to a connection device 22 for interconnecting nodes. Specific examples of the connection device 22 are crossbars, a mesh network, etc.

The above processor 1 adopts a configuration in which all the elements illustrated in FIG. 1 are mounted on one LSI. However, a processor adopting a configuration in which all the elements illustrated in FIG. 1 are included in one package may also be used as the processor 1. In other words, a processor adopting a configuration in which at least one semiconductor chip having core 11 mounted thereon and another chip having the shared cache memory 13 mounted thereon are set in one package may also be used.

Figure 2:
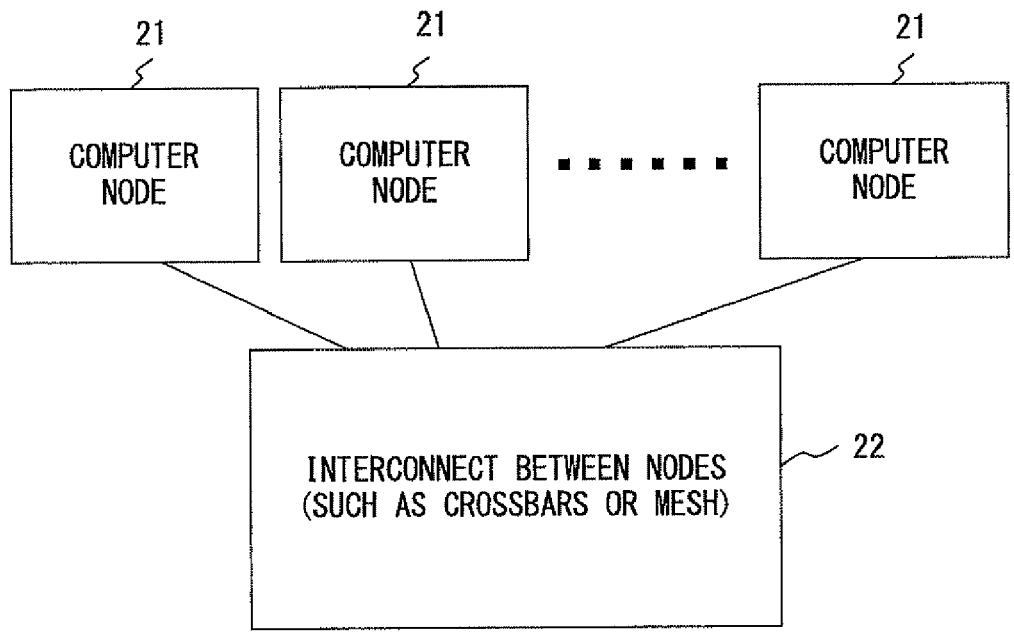
FIG. 2 illustrates a configuration of a computer system to which a multi-core processor of the present invention is applied.
Figure 3:
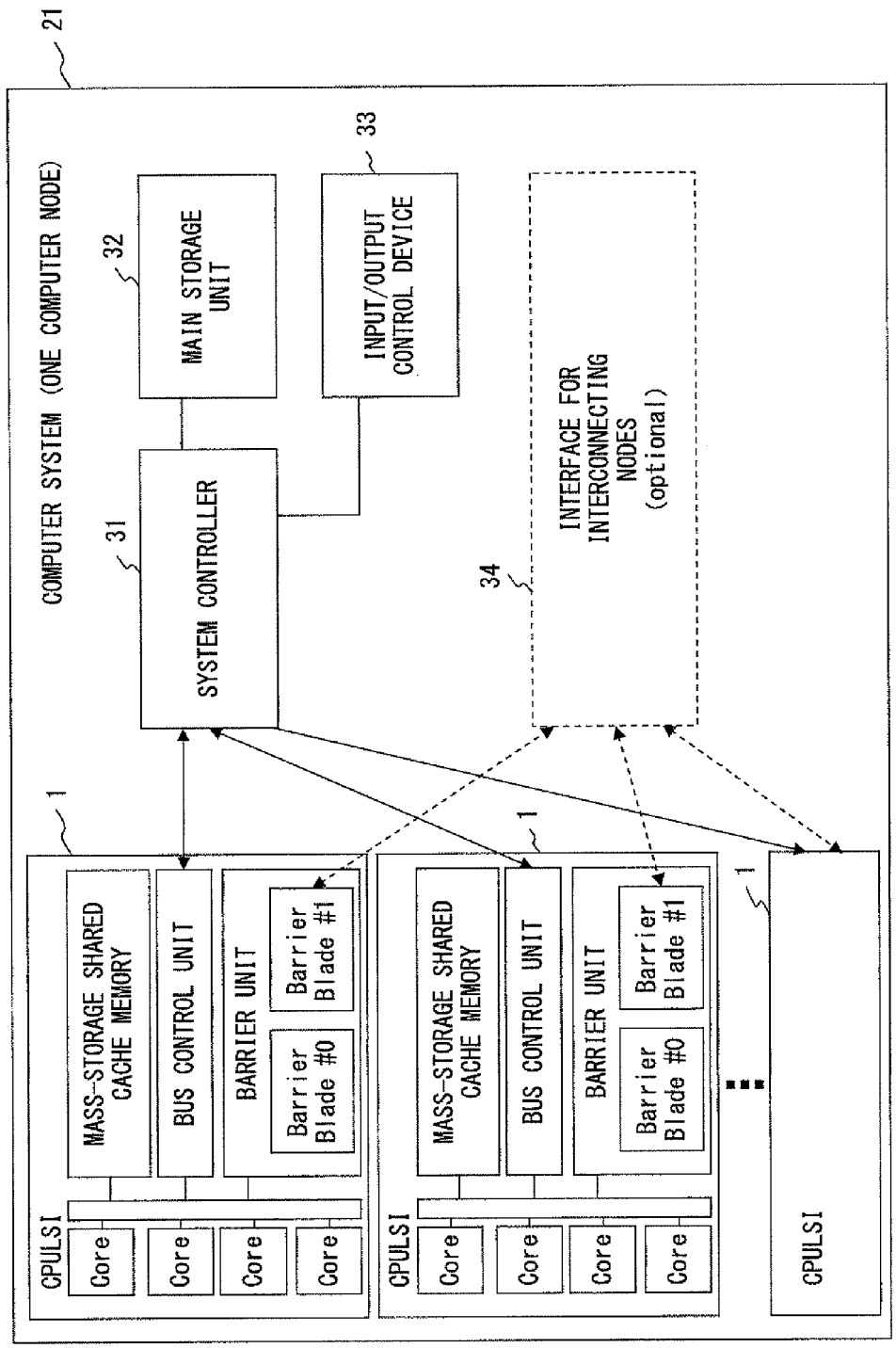
FIG. 3 illustrates a configuration of a computer node used in the computer system illustrated in FIG. 2.

The compute nodes (information processing devices that are computation systems) 21 of FIG. 2 are configured, for example, as illustrated in FIG. 3. As illustrated in FIG. 3, each computer node 21 has plural processors 1, and each of the processors 1 is connected to a system controller 31 through a system bus (not illustrated). A main storage unit 32 shared by the processors 1 and an input/output control device 33 for inputting and outputting data from and to an external storage device (not illustrated) are connected to the system controller 31. An interface 34 for transmitting and receiving data to and from a connection device 22 is a device that is optionally mounted when the computer node 21 is to be connected to the connection device 22. When the interface 34 is for wireless LANs, the connection device 22 may not be used.

Figure 4:
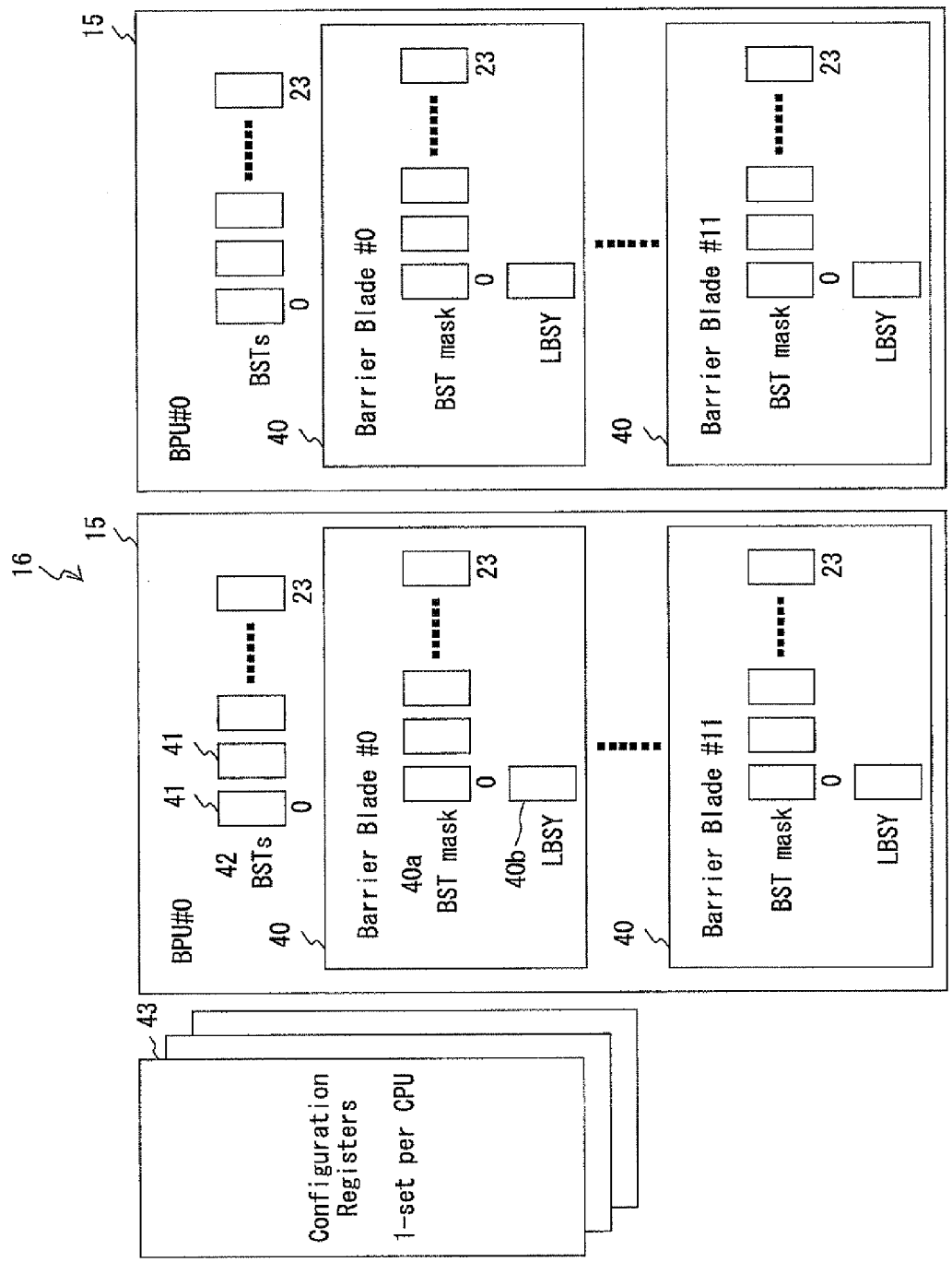
FIG. 4 illustrates a configuration of a barrier device.

FIG. 4 illustrates a configuration of the barrier unit 16. The barrier unit 16 includes 2 barrier processing devices 15 and as many configuration registers 43 as there are logic processors (virtual cores that can be recognized by OS). Each of the barrier processing devices 15 includes a BST group 42 having plural BSTs (Barrier STatus registers), and also includes plural barrier synchronization execution units 40 (referred to as barrier blades in the figure, and will be referred to as "barrier blades 40" hereinafter), each of which can execute a synchronization process of one synchronization group.

Each of the BSTs 41 constituting the BST group 42 is assigned a different logic processor. The BSTs 41 are registers for storing one-bit data. Each logic processor (core 11 to which that logic processor is assigned) writes "1" upon the termination of the execution of a process to be executed as parallel processing, and writes "0" upon the starting of the execution of the next process. Thereby, the value of the BST 41 represents the execution status of a process of the corresponding logic processor. The point at which the value changes from 0 to 1 indicates the fact that a waiting state has started in order to realize synchronization with another logic processor that belongs to the same synchronization group. This point is referred to as a synchronization point hereinafter.

The number of logic processors in each of the cores 11 is two. In the present embodiment, twenty-four barrier blades 40 in total (3×2×4) are prepared in order to respond to three synchronization groups existing for one logic processor. Thus, twenty-four BSTs 41 are prepared as well.

Figure 5:
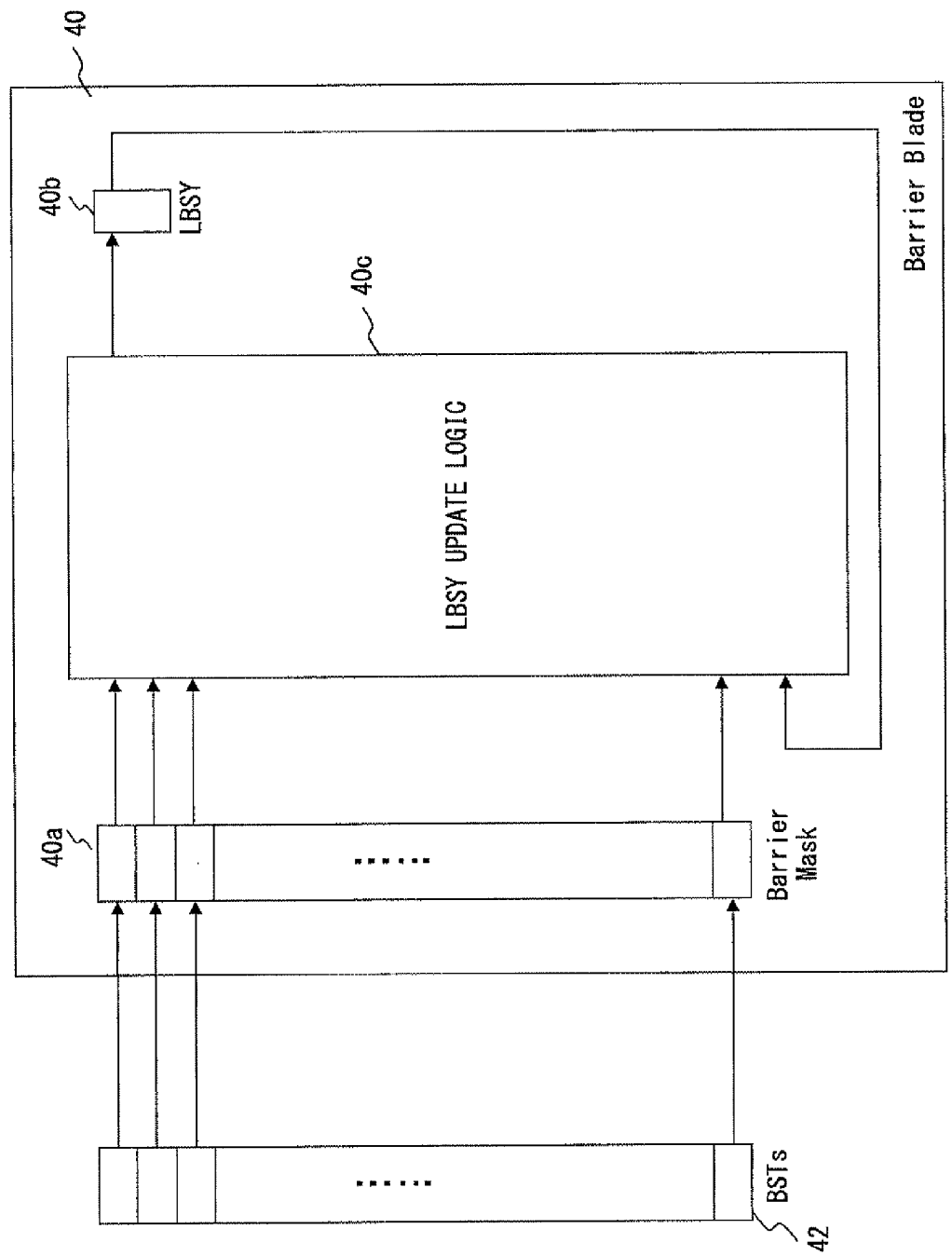
FIG. 5 illustrates a configuration of a barrier blade.

FIG. 5 illustrates a configuration of the above barrier blade 40. The barrier blade 40 includes a BST mask register 40a that can hold as many bits as the total number of the BSTs 41, an LBSY (Last Barrier Synchronization register) 40b, and an LBSY update logic (circuit) 40c.

The BST mask register 40a stores combination data representing a combination of logic processors belonging to the synchronization group assigned to the barrier blade 40. For example, the bit values, in combination data, corresponding to a logic processor belonging to the synchronization group and corresponding to a logic processor not belonging to the synchronization group are 1 and 0, respectively. The LBSY update logic 40c uses only the value of the BST 41 assigned to the logic processor belonging to the synchronization group in the BST group 42 on the basis of the BST mask register 40a holding combination data such as described above so that the LBSY update logic 40c can update the value of the LBSY 40b (LBSY value). This update is performed by writing to the LBSY 40b NOT of the current LBSY value (when the current LBSY value is 0, 1 is written and when the value is 1, 0 is written) when the values of all the BSTs 41 as targets are identical.

Processes (entire processes of a program including plural threads) that are the target of distributed processing are sometimes subject to change. Specifically, another process may be added or a process may be deleted. When a process is added, that process is assigned the barrier blade 40 for synchronization, and the combination data has to be held in the BST mask register 40a. In order to reduce the number of times such setting is performed—in other words, in order to reduce the number of processes executed by the core 11 for realizing barrier synchronization—so that the time period required for that process is reduced, three barrier blades 40 are prepared for each logic processor. In order to reduce the number of times setting is performed, it is desirable to prepare two or more barrier blades 40 for one logic processor. In other words, it is desired that the total number N of the barrier blades 40 satisfy:

$$N \geq 2M \cdot X$$

where M represents the total number of the cores 11, and X represents the total number of logic processors for one core 11.

Figure 9:
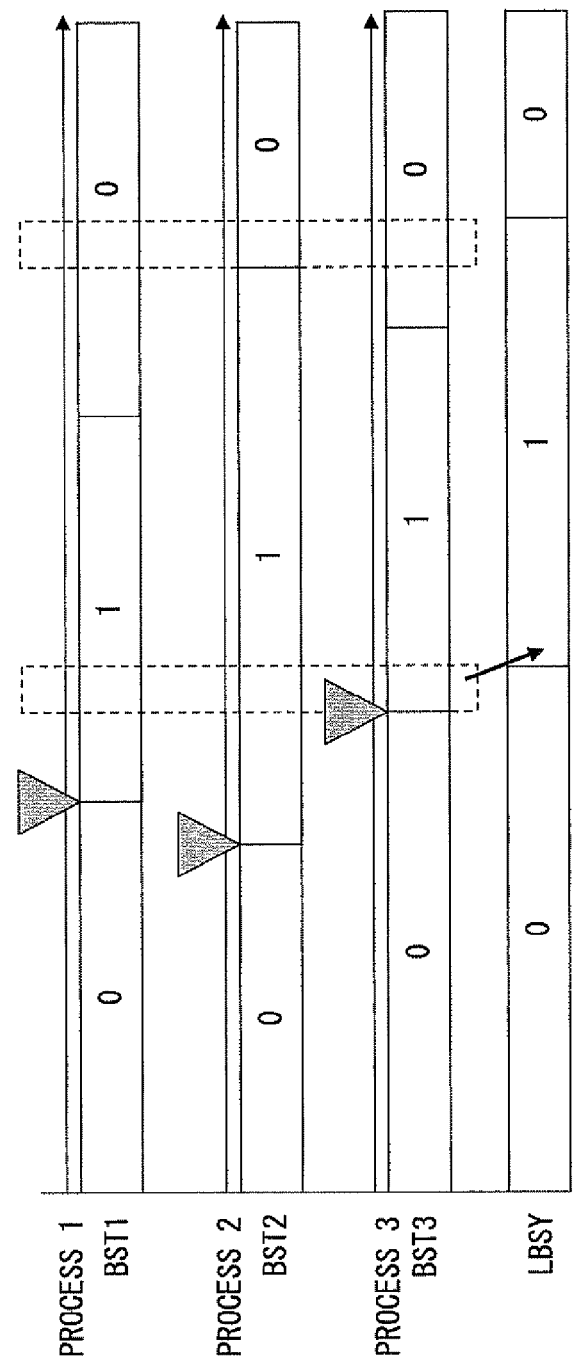
FIG. 9 illustrates a method of updating an LBSY value performed by an LBSY update logic.

FIG. 9 illustrates a method of updating an LBSY value using the LBSY update logic 40c. "Process 1" through "Process 3" in FIG. 9 respectively represent the processes assigned to logic processors belonging to the same synchronization group, and "BST1" through "BST3" respectively represent the BSTs 41 whose values are updated by the logic processors that execute processes 1 through 3. This is also applied to FIG. 10, which will be explained later. As illustrated in FIG. 9, the value of LBSY 40b is updated from 0 to 1 when the values of all of the BSTs 1 through 3 become 1, and thereafter it is updated from 1 to 0 when the values of all the BSTs 1 through 3 become 0.

The cores 11 access various registers in the barrier unit 16, specifically the configuration registers 43, the BSTs 41, the BST mask registers 40a, and the like through the shared cache control unit 12. Thus, accesses take a long period of time to some extent. A logic processor that has written the logical value 1 to the BST 41 after the termination of a process has to monitor (polling) the LBSY value in order to confirm that the value has changed to 1. Because of this monitoring, a spin loop that repeatedly accesses the LBSY value can occur. Accordingly, the present embodiment follows the procedures below, which will be explained specifically by referring to FIGS. 6 through 8 and FIG. 10.

Figure 6:
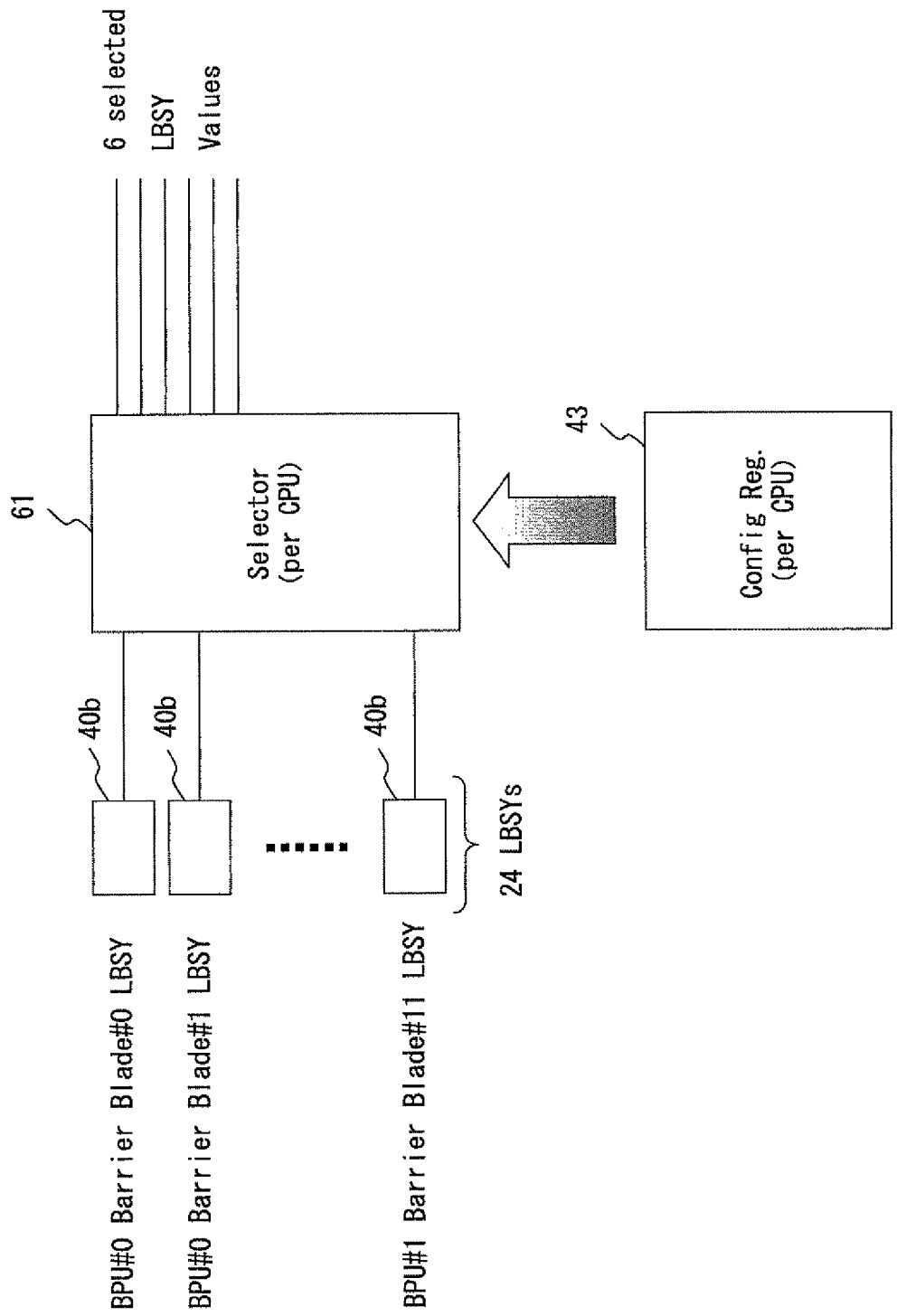
FIG. 6 illustrates a writing mechanism for copying an LBSY value onto a processor core.
Figure 7:
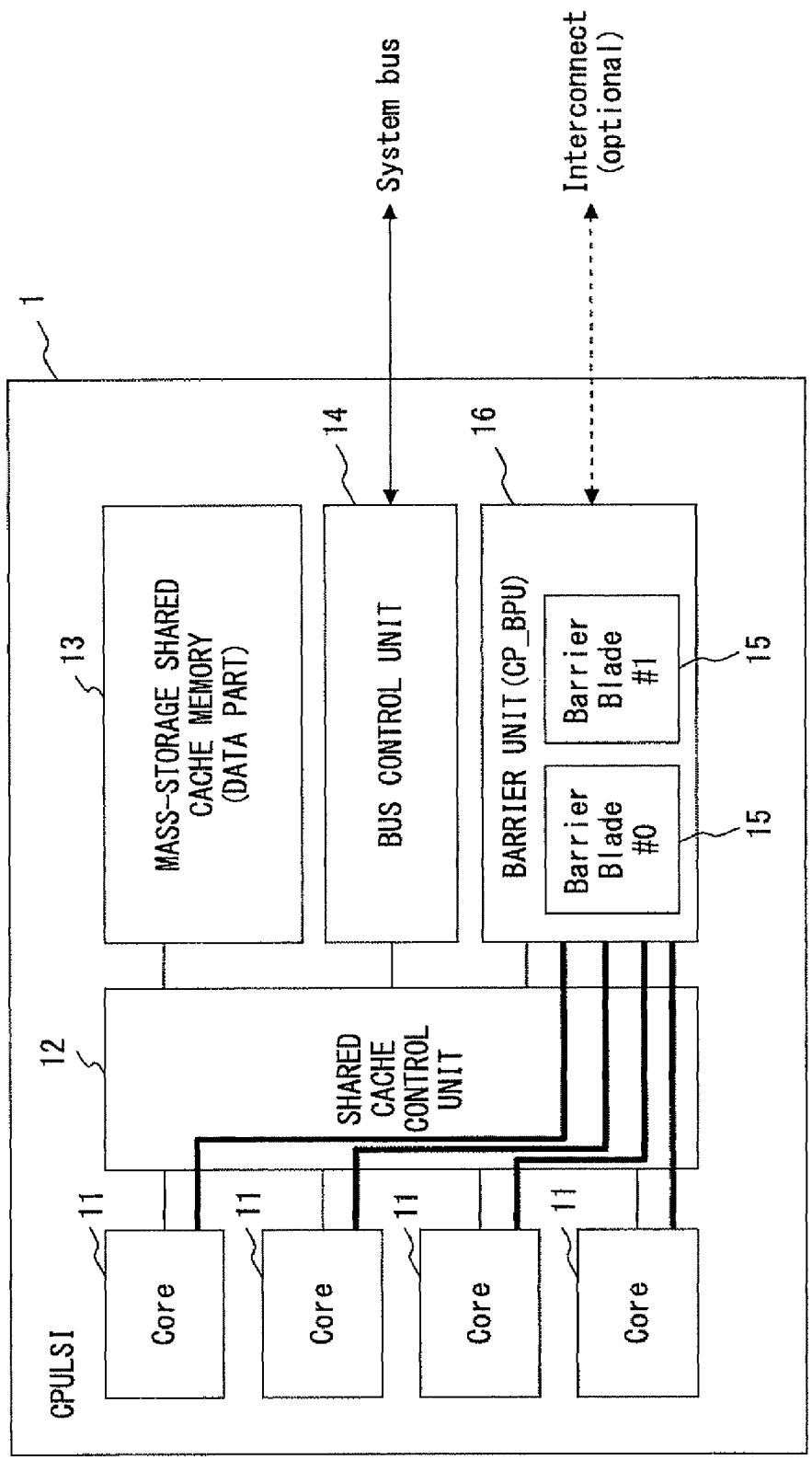
FIG. 7 illustrates a dedicated wire provided for the copying by the writing mechanism illustrated in FIG. 6.

In order to allow the core 11 to confirm the LBSY value promptly, the LBSY value to be monitored by that core 11 is copied from the barrier blade 40 to the core 11. FIG. 6 illustrates a mechanism for the writing of the copied value.

A selector 61 illustrated in FIG. 6 is prepared for each of the configuration registers 43, i.e., for each logic processor. The LBSY value stored in the LBSY 40b of each of the barrier blades 40 is input into the selectors 61, and each of the selectors 61 selects 6 LBSY values from among the 24 LBSY values so as to output them in accordance with the data stored in the corresponding configuration register 43. The wires on the output side (6 wires in total) are connected to the corresponding core 11 as indicated by the thick lines running through the shared cache control unit 12 in FIG. 7. Thus, the LBSY values selected by the selector 61 are directly output (copied) to the corresponding cores 11. Each of the cores 11 can have 2 logic processors, and accordingly there are 12 wires for one thick line.

Each selector 61 is disposed in the barrier unit 16. This is because the closer the selector 61 is disposed to the core 11, the longer the entire wire is. Thus, the entire length of the wire that is needed to input LBSY values to the selector 61 is minimized so as to suppress influence to design and the like.

FIG. 8 illustrates a configuration of the core 11 related to the above writing mechanism.

The 6 LBSY values output from the writing mechanism are stored in a register 83. AN LBSY value change detection unit 82 can detect change in the LBSY values stored in the register 83. An instruction control unit 81 extracts instructions in the first cache (not illustrated) in order to execute them.

The register 83 is provided close to the instruction control unit 81 so that high-speed access can be performed. When the register 83 in the core 11 has become a target in which the LBSY values are monitored, fewer monitoring requests are issued to the shared cache control unit 12. Thereby, a higher speed can be achieved, and the load on the shared cache control unit 12 is reduced. Reading LBSY values via the shared cache control unit 12 takes several tens of nano seconds. However, reading data in the register 83 can reduce that period to several nano seconds. Memory onto which LBSY values are to be copied may be of a different type than the register 83.

None of the logic processors can execute the process assigned to performing distributed processing until the synchronization point is achieved, i.e., during a period after the value of the corresponding BST 41 is rewritten from 0 to 1 and before the LBSY value is updated (from 0 to 1). Thus, in the present embodiment, in order to reduce power consumption during that period, a logical processor that has reached the synchronization point shifts to the sleep state. The LBSY value change detection unit 82 detects change in the LBSY values, and is prepared to request that the instruction control unit 81 cancel the sleep state. In response to that sleep state cancelling request, the instruction control unit 81 cancels the sleep state in order to recover to the previous state. Shifting to the sleep state is performed by a program (software) executed by the logic processor. In addition, different quiescent states may be adopted as a state to which the instruction control unit 81 shifts after reaching the synchronization point as long as that state can prevent the use of resources (buffer, temporary registers, or like) needed for calculation, can reduce power consumption, and can allow high-speed recovery.

Figure 10:
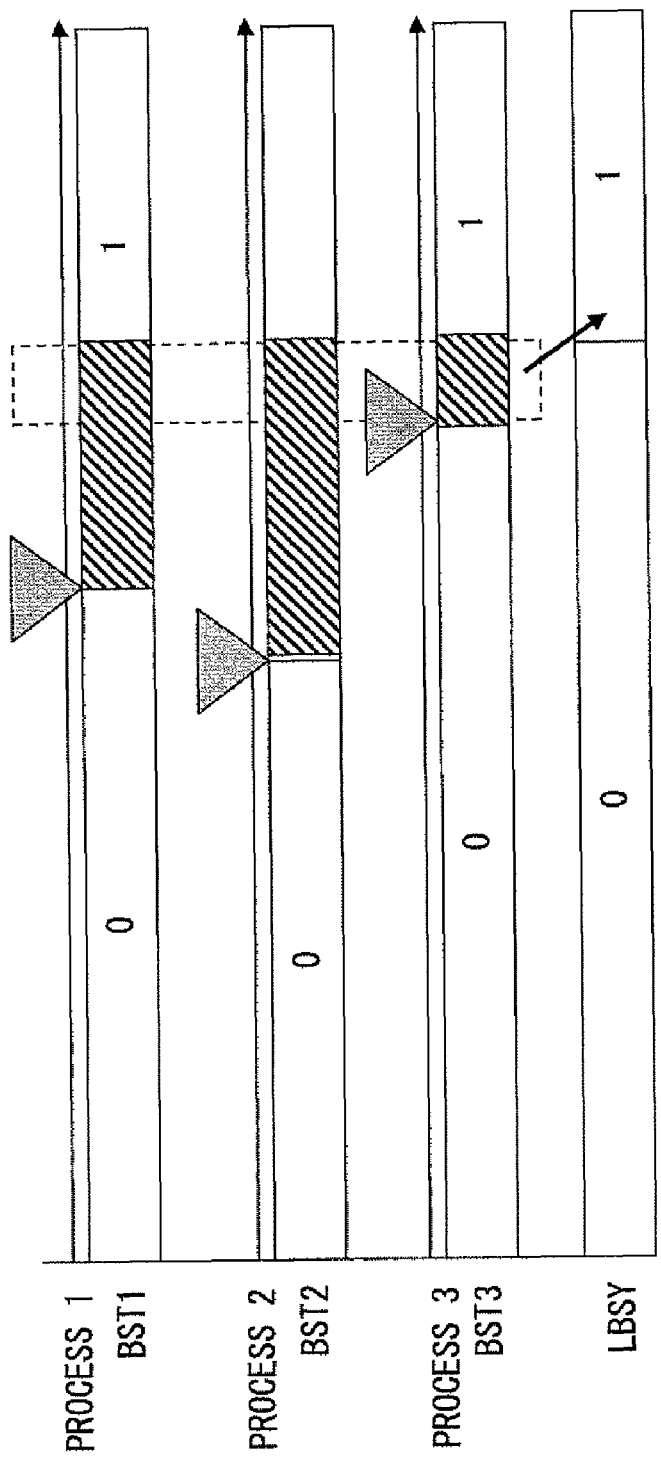
FIG. 10 illustrates a term during which each processor core is shifting to a sleep state.

FIG. 10 illustrates a period during which it is in the sleep state. Periods during which the logic processors to execute processes 1 through 3 are in the sleep state are displayed as shaded areas of BSTs 1 through 3. As illustrated in FIG. 1, the respective logic processors are in the sleep state after they have reached the synchronization points, marked by the triangles, and before the LBSY values change to 1.

Two pairs each consisting of six registers 83 and one LBSY value change detection unit 82 are prepared. Thereby, even a different logic processor of the core 11 shifts to the sleep state if it has reached the synchronization point, and recovers to the previous state when the LBSY value changes.

It is possible to determine that the LBSY values have changed when one of the six LBSY values is detected to have changed. However, the changes in the LBSY values can also be determined by the change in the LBSY value corresponding to the synchronization group for which a process was terminated.

Shifting to the above sleep state is performed in units of logic processors. However, this may be performed in units of the cores 11, or may be performed in units of one processor. In such a case, the processor 1 does not necessarily need to be a multi-core processor.

Figure 11:
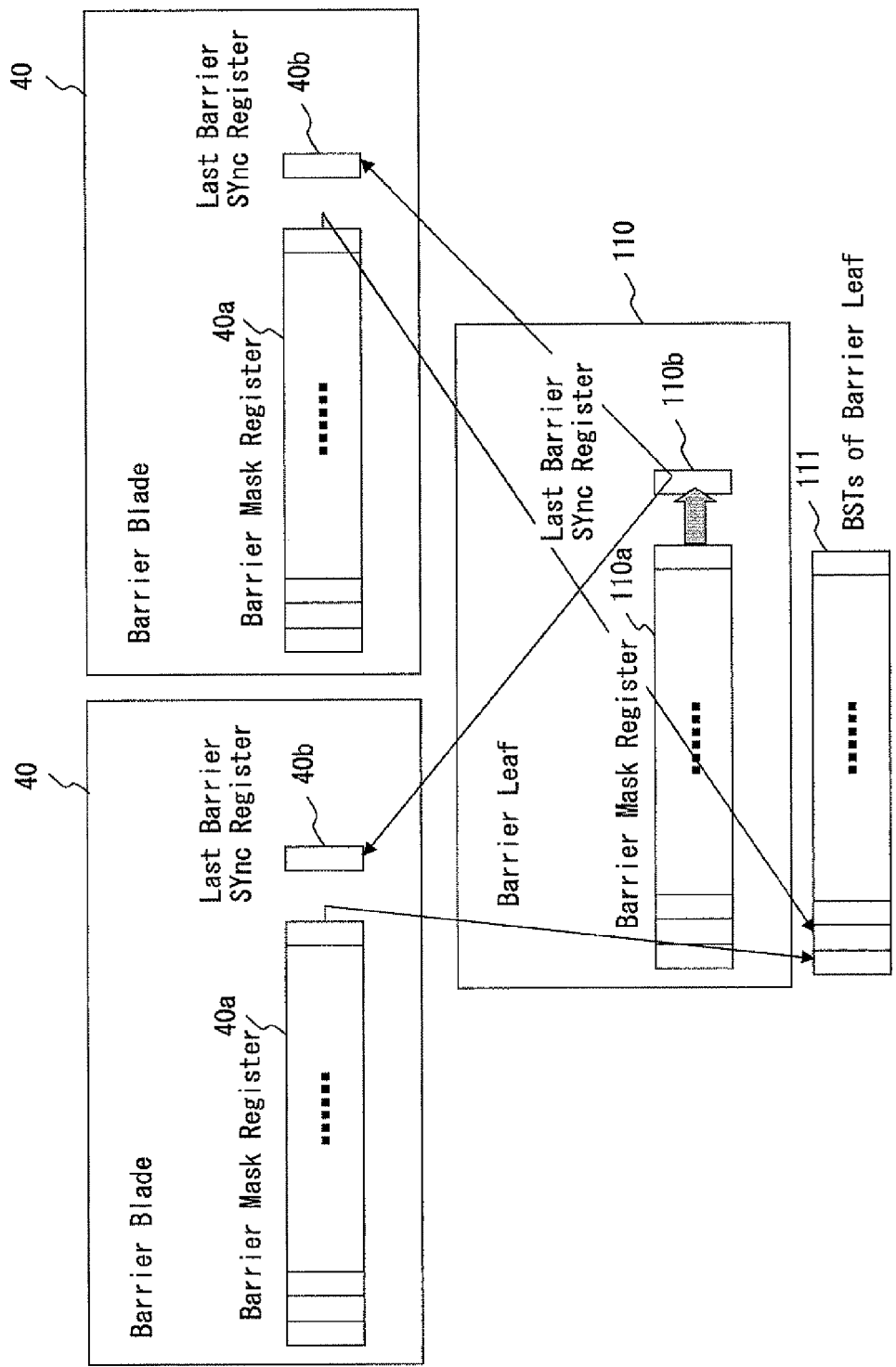
FIG. 11 illustrates a method of performing barrier synchronization when not all processor cores belonging to the same synchronization group are in one multi-core processor.

FIG. 11 illustrates a method of performing barrier synchronization when not all logic processors belonging to the same synchronization group are in one multi-core processor.

In FIG. 11, two barrier blades 40 are included in the different processors 1. A barrier leaf 110 is included in a constituent element other than the processor 1, such as the system controller 31 illustrated in FIG. 3 or the connection device 22 illustrated in FIG. 2. The barrier leaf 110 and a BST group 111 are included in the barrier processing device (FIG. 4). Herein, for simplicity, the barrier leaf 110 and the like are assumed to be in the barrier device in the connection device 22.

Each barrier blade 40 determines the BST 41, in the BST group 42, whose value is to be transmitted by the barrier blade 40 from the BST mask register 40*a*. The value of the determined BST 41 is transmitted to the connection device 22 through the interface 34, and is stored in the corresponding BST in the BST group 111. Thereby, similarly to the barrier blade 40, the barrier leaf 110 updates the value of the LBSY 110*b* as necessary on the basis of the combination between BSTs specified by the a mask register 110*a* in the BST group 111. The value of the LBSY 110*b* is transmitted to each barrier blade 40, and is stored in the LBSY 40*b*. By copying the value of the LBSY 40*b* onto the corresponding core 11, barrier synchronization is realized.

Additionally, LBSY values in the barrier unit 16 can be directly copied onto the respective cores 11 in the present embodiment. However, it is not necessary for all the cores 11 to allow direct copying. It is also possible to employ a configuration in which a sleep state starts when the writing of the value 1 to the corresponding BST 41 starts.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to an illustrating of the superiority or inferiority of the invention. Although the embodiment of the present invention has been described in detail, it is preferable to be understood that various changes, substitutions, and alterations could be made hereto without departing from the spirit and scope of the invention.

The invention claimed is:

1. A barrier synchronization method for causing a plurality of processors to execute a parallel processing, comprising:
   when a processor of the plurality of processors completes a process to be executed in the parallel processing, inverting a value of a barrier state register corresponding to the processor, wherein
   each of the plurality of processors corresponds to one of a plurality of the barrier status registers, each of the plurality of the barrier status registers storing one-bit data indicating an execution status of a process executed by a corresponding processor, and
   barrier synchronization of the plurality of processors is executed by a plurality of barrier blades, and each one of the plurality of barrier blades includes
   a barrier mask register having a plurality of bits, each bit of barrier mask register corresponding to one of the plurality of processors and indicating whether or not a corresponding processor is included in a synchronization group in which a set of processors execute the parallel processing together, and
   a Last Barrier Synchronization register (LBSY); and inverting a value of the LBSY when values of barrier status registers, in a same synchronization group indicated by the barrier mask register, become same.

2. The barrier synchronization method according to claim 1, wherein:
the processor includes a register for storing a copy of the LBSY; and
the method further comprises
copying the value of the LBSY in the register.

3. The barrier synchronization method according to claim 1, further comprising:
until an execution of the next parallel processing is started, shifting, to a quiescent state, a processor that inverted the value of the barrier state register.

4. A barrier synchronization device for causing a plurality of processors to execute a parallel processing, comprising:
a plurality of processors; and
a barrier unit including
a plurality of barrier status registers each of which corresponds to one of the plurality of processors and stores one-bit data indicating an execution status of a process executed by a corresponding processor, and
a plurality of barrier blades for executing barrier synchronization, each one of the plurality of barrier blades including
a barrier mask register having a plurality of bits, each bit of barrier mask register corresponds to one of the plurality of processors and indicates that whether or not a corresponding processor is included in a synchronization group in which a set of processors execute the parallel processing together, and
a Last Barrier Synchronization register (LBSY), whose value is inverted when values of barrier status registers, in a same synchronization group indicated by the barrier mask register, become same.

5. The barrier synchronization device according to claim 4, wherein
each of the plurality of processors includes a register for storing a copy of the LBSY, and
the barrier synchronization device further comprises:
information writing unit to write the value of the LBSY to the register.

6. The barrier synchronization device according to claim 4, wherein:
each of the plurality of processors is a logic processor configured by one of a plurality of processor cores mounted on a multi-core processor;
N, which is a total number of the barrier blades satisfies:

$$N \geq 2M \cdot X$$

where M represents a total number of the processor cores, and X represents a total number of logic processors configured by a processor core.

7. The barrier synchronization device according to claim 4, wherein:
each of the plurality of processors is a logic processor configured by one of a plurality of processor cores mounted on a multi-core processor; and
in the multi-core processor, the plurality of processor cores are mounted on one LSI.

8. The barrier synchronization device according to claim 4, wherein:

each of the plurality of processors is a logic processor configured by one of a plurality of processor cores mounted on a multi-core processor; and
the multi-core processor is a processor in which the plurality of processor cores share cache memory.

9. A multi-core processor including a logic processor configured by one of a plurality of processor cores mounted on a multi-core processor, comprising:
a plurality of processors; and
a barrier unit including
a plurality of barrier status registers each of which corresponds to one of the plurality of processors and stores one-bit data indicating an execution status of a process executed by a corresponding processor, and
a plurality of barrier blades for executing barrier synchronization, each one of the plurality of barrier blades including
a barrier mask register having a plurality of bits, each bit of barrier mask register corresponds to one of the plurality of processors and indicates that whether or not a corresponding processor is included in a synchronization group in which a set of processors execute the parallel processing together, and
a Last Barrier Synchronization register (LBSY), whose value is inverted when values of barrier status registers, in a same synchronization group indicated by the barrier mask register, become same.

10. The multi-core processor according to claim 9, wherein:
N, which is a total number of the barrier blades, satisfies:

$$N \geq 2M \cdot X$$

where M represents a total number of the processor cores, and X represents a total number of logic processors configured by a processor core.

11. The multi-core processor according to claim 9, wherein:
the multi-core processor is a processor configured by mounting the plurality of processor cores on one LSI.

12. The multi-core processor according to claim 9, wherein:
the multi-core processor is a processor in which the plurality of processor cores share cache memory.

13. A multi-core processor including a plurality of logic processers configured by one of a plurality of processor cores mounted on a multi-core processer, comprising;
a barrier synchronization device to synchronize at least two logic processers belonging to a same synchronization group among the plurality of logic processers, and
reporting unit to report, to the barrier synchronization device, state information indicating execution states of the plurality of logic processers;
wherein N, which is a total number of the barrier blades, satisfies:

$$N \geq 2M \cdot X$$

where M represents a total number of the processor cores, and X represents a total number of logic processors configured by a processor core.

* * * * *

UNITED STATES PATENT AND TRADEMARK OFFICE
CERTIFICATE OF CORRECTION

| | |
|---|---|
| PATENT NO. | : 7,971,029 B2 |
| APPLICATION NO. | : 12/638746 |
| DATED | : June 28, 2011 |
| INVENTOR(S) | : Hideyuki Unno et al. |

It is certified that error appears in the above-identified patent and that said Letters Patent is hereby corrected as shown below:

On the Title Page:

Add: Item --(63)    Related U.S. Application Data

Continuation of application No. PCT/JP2007/000664, filed on June 20, 2007--

Signed and Sealed this
Seventeenth Day of July, 2012

David J. Kappos
*Director of the United States Patent and Trademark Office*